UNITED STATES PATENT OFFICE 2,137,994

ORGANIC PRODUCT AND PROCESS OF MAKING THE SAME

Allen D. Whipple, Alexandria, Ind., assignor to The Mantle Lamp Company of America, Chicago, Ill., a corporation of Illinois No Drawing. Application August 20, 1931, Serial No. 558,329

29 Claims. (Cl. 260—8)

The invention relates to processes employed in the production of synthetic or in the treatment of natural substances, and one object of the invention is to so produce a synthetic or to so treat a natural substance, that both will be responsive only to certain radiations, whereby those of undesired ranges of frequency will be retarded, while light waves of desired ranges of frequency will be transmitted through said substances to thereby produce desired optical effects.

Another object of the invention is to prevent the absorption of such destructive visible or invisible rays as would, if absorbed by a synthetic or a natural substance, induce undesired chemical or physical alterations therein, and this object I attain by adding to and thoroughly blending with the ingredients used in the production of a synthetic compound, or with a natural substance, one, or more than one, stabilizing substance.

The invention, broadly considered, includes a synthetic or a treated substance which is transparent within the visible range of frequencies, and possesses such resistant optical characteristics, as regards either visible or invisible radiations, as will prevent undesired chemical or physical alterations within it. The invention also includes, broadly, a process whereby such a stabilized synthetic compound or substance may be produced, or whereby a natural substance may be treated in order to stabilize it.

Specifically considered, the invention includes incorporating in a synthetic compound or in a natural substance a minute proportion of material which, although it is quantitatively insufficient to act as a pigment in either case or to accelerate condensation and/or polymerization during the production of a synthetic substance, is capable of preventing that compound or substance from absorbing waves of such frequencies as would, if absorbed, not only effectuate undesired chemical or physical alterations in, but also interfere with the desired light-transmitting characteristics of the synthetic substance or the treated natural substance.

The invention is especially applicable to the production of condensation products such, for example, as are produced by heating a mixture of ethylene glycol ($CH_2OHCH_2OH$) and phthalic anhydride ($C_6H_4(CO)_2O$) in the proportion of one molecule of each.

To ten million parts of this mixture should be added 25 to 35 parts by weight of copper carbonate ($Cu_2(OH)_2CO_3$). The mixture should then be heated to a temperature of from 110 to 150 degrees centigrade, a temperature of approximately 130 degrees centrigrade being preferable, the ingredients being constantly agitated until polymerization has progressed to any desired point, this point being determined by ascertaining the acid numbers in the usual manner.

While possibly useful products, which are attacked by water, are produced during the earlier stages of the process, other and more useful products, that are unaffected by water, are later produced. All of these products are colorless, and, with the exception of those which are affected by water, are stable.

Tests have shown that, if the acid numbers are, respectively, 14, 18, 28 and 35, the initially-clear and transparent products will be attacked and clouded by water in a very high degree; that, if the acid numbers are, respectively, 26, 27, 36, and 37, the water attack is less severe; and that if the acid number is from 0 to 13, 15 to 17, 19 to 25, 29 to 34, or 38 to 40 (all inclusive), the water attack is so negligible that the products will retain, unimpaired, their inherent transparency and brilliancy for very long periods of time.

All of these products are soluble in methyl cellosolve, acetone, diacetone, ethylene dichloride, dichlor-ethyl ether, carbitol, dioxan, cellosolve acetate and a 50–50 mixture of ethyl alcohol and ethylene dichloride, as well as other solvents, and, when dissolved, become stable lacquers or varnishes with which surfaces of various articles may be coated.

Substitutes for the copper carbonate are any substances which will produce the herein-described optical results. Among these substances are colloidal or finely-divided metals, or any of the following metallic compounds cobaltus carbonate, lithium carbonate, manganese carbonate, cadmium carbonate, barium carbonate, bismuth subcarbonate, calcium nitrate, beryllium nitrate, lithium nitrate, sodium acetate, cupric acetate, manganese acetate, cobaltic hydrate, beryllium hydrate, copper hydrate, and thorium hydrate.

A mixture of cobaltus carbonate and copper carbonate, or a mixture of cobaltus carbonate, copper carbonate and bismuth subcarbonate, may also be used. These materials are, like the copper carbonate, added to the main ingredients of the mixture in such minute proportions (25 to 50 parts by weight in ten million) as to determine the desired effect in the product.

Since the molecular weights of the above-named substitutes for copper carbonate vary, the proportion should be varied so that the weight of the metallic constituent will be the same as that of the metallic constituent of the copper carbonate described in the example above given.

Similar products may be made by substituting for the ethylene glycol, propyl glycol, glycerine, butyl glycol, or other polyhydric alcohols; and for the phthalic anhydride, succinic acid, maleic acid or any other polybasic acid which will so react upon a polyhydric alcohol as to form a condensation and/or polymerization product.

In all tests wherein the copper carbonate, or one of its above-described substitutes, was omitted, and the ethylene glycol and the phthalic anhydride were the only constituents of the mixture, the products taken at successive stages of the process, conducted as above described, were yellow, thus affording conclusive evidence that copper carbonate or any of its substitutes is a substance which, when used in the correct proportion, acts to inhibit the production of color in a synthetic compound which normally would be colored, and it may, therefore, properly be called an inhibitive substance.

It has been pointed out that the use of metallic compounds, other than those containing copper, would require the use of other weights of metal or metallic compounds than those given for copper or copper compounds. Similarly, the resistance of the final product to the destructive effects of light and heat will vary with the proportion of the metal or metallic compound used, regardless of whether it be copper, or a compound thereof, or some other metal or metallic compound. Also, the quantities of such metals or metallic compounds will vary with the raw materials being reacted upon.

If, instead of ethylene glycol and phthalic anhydride, urea and formaldehyde are the raw materials, the quantity of metal or metallic compound must be varied, so that in some circumstances, in order to achieve the desired result with respect to the manner in which a substance reacts to light and heat, it may be necessary to use proportions of metal or metallic compounds as high as 5000 parts by weight in ten million.

The general principle of the invention may also be applied to the production of synthetic substances of kinds other than those of the class hereinbefore described, as, for example, a condensation product resulting from the condensation and polymerization of formaldehyde and urea in the proportion of three molecules of the former to one of the latter, or a phenolic condensation product, either of which is qualified by the inclusion of a minute determinate proportion of any one, or more than one, of the metallic salts described herein, or their equivalents.

In preparing these products in vessels of various materials, as, for example, glass or aluminum, varied results will occur, these varied results being due to whatever reactions may take place between the walls of the vessels and their contents. For example, when synthetic substances, such as above described, are produced in a glass container and, the addition of 25 parts by weight of copper carbonate to ten million parts of the starting materials will yield a colorless product, if the synthetic substance is produced in an aluminum vessel, it may be necessary to use 30 parts by weight of copper carbonate to ten million parts of the starting materials to produce the same result.

Also, the use of an excess of copper carbonate will cause the product to have a greenish tinge. This fact affords a means for determining the proportion of copper carbonate which will be required for the production of a substantially colorless substance, particularly in cases wherein the purity of the ingredients varies, the greenish tinge being an indication that the proportion of copper carbonate is excessive and should be reduced in succeeding batches, until the product will transmit, without selection, substantially all of the frequencies of white light.

Having thus ascertained the determinate proportion of copper carbonate required to produce the desired result in a given container and with a given substance, the proportions of other metallic salts which, either alone or in combination, are capable of producing that result, may be ascertained in the manner hereinbefore stated.

The effects observed, being the result of the introduction of such minute proportions of metals or metallic salts, suggest the theory that these introductions modify in some way what may be called the "vibration period" of the substance, so as to permit the transmission of all of the frequencies of white light without appreciable selection.

As a further suggestion of the correctness of the theory mentioned above, it is noted that some substances which are normally yellow when made without the introduction of the metal or metallic salt, have a transmission for visible light of the order of from 40 to 66%, whereas the same substances, treated by the introduction of a suitable metal or metallic salt in such proportion as to permit the transmission of white light without appreciable selection, have a transmission of 88%. (The measurements in both cases are stated for a thickness of one millimeter.)

These observations also suggest that the internal structure of a substance having no metallic salt introduced therein and having, for example, a yellow color is modified by the introduction of the minute proportion of metals or metallic salts.

That the before-described process also applies to natural organic substance is shown by the fact that lard and cotton-seed oil, when treated as above described, exhibit similar phenomena.

When in this specification or the claims, the word "optical" is employed, it is intended to refer to such properties of the product as may affect any emanations, whether within or without the visible range. Also, the word "light" includes both visible an invisible emanations.

Furthermore, the word "stabilized" refers to any natural or synthetic organic substance whose physical properties have been so altered by the introduction of another substance, such as a metal, that said natural or synthetic substance is incapable of absorbing rays of such frequencies as would, if not excluded, cause that substance to deteriorate.

When, in the claims, reference is made to a metal, that word is intended to cover metals per se, or mixtures of metals, or metallic compounds, or mixtures of metallic compounds, or mixtures of metals and metallic compounds, which will vary the optical properties of an organic compound as hereinbefore set forth.

The process herein described may be conducted at either a somewhat elevated or a somewhat reduced pressure, although experiments have shown that the results are not improved by varying the pressure.

As has already been pointed out, experiment has shown that my process may be successfully applied to a variety of organic compounds or substances. It would not be applicable, however, to inhibit discoloration in compounds that are initially and inherently strongly colored, or to increase the transparency of compounds which are substantially opaque. It has not been possible, for obvious reasons, to test my process to determine its applicability to more than a relatively very small number of those organic compounds with which it undoubtedly may be employed to produce a commercially important improvement.

I have stated that my process may be employed in the production of synthetic substances and in the treatment of natural substances, and I have described how it is to be applied to synthetic resins such as those produced by the condensation of a polybasic acid and a polyhydric alcohol, or by the condensation of a carbocyclic-hydroxyl derivative such as phenol, and an aldehyde such as formaldehyde. These resinous products are also known as condensation products or polymerization products and my process is also applicable to condensation products and polymerization products other than those included in the two chemical groups mentioned, and also to natural resins and resinous products. Similarly, my process is applicable to natural substances of an oleaginous nature such as lard in the animal fat group, and cotton-seed oil in the vegetable oil group.

When in the claims, therefore, I refer to organic compounds, I mean to include those organic substances, whether simple or complex, to which my process may be successfully applied. It is the essence of my invention that I employ a relatively minute determinate proportion of a selected metal to either increase light transmission or inhibit the production of the color which would otherwise occur or the discoloration which does occur in certain organic compounds or substances, or to secure all of these results. I also produce, in a variety of products, a stabilization against subsequent deterioration due to the destructive effects of light and/or heat. It is to be understood, therefore, that the application of my process to any organic substance which may be improved thereby, in accordance with the instructions I have given, lies within the scope of my invention.

I have pointed out above that the minute proportion of a selected metal necessary in any particular compound to produce the described results, may vary with the degree of purity of the ingredients or materials employed. When in the claims, therefore, I refer to a particular organic compound, it will be understood that I mean a specific batch or quantity of the compound, since another batch or quantity may require a slightly different minute proportion of the selected metal.

Having thus described my invention, what I claim is:

1. The process of producing a highly transparent synthetic resin which includes introducing into a mixture of phthalic anhydride and ethylene glycol in the proportion of one molecule of each, from 25 to 35 parts by weight in ten million of copper carbonate, heating the mixture to a temperature of from 110 to 150 degrees centigrade, and maintaining said mixture at said temperature, while constantly agitating the same, until said resin is produced and said metal is incorporated therein.

2. The process of producing a substantially colorless synthetic resin which includes introducing into a mixture containing phthalic anhydride and ethylene glycol in the ratio of one molecule of each, that minute determinate proportion of a selected metal which when incorporated in said resin will inhibit the production of color which would otherwise occur therein, heating the mixture to, preferably, 130 degrees centigrade, and continuing the heating until said resin is produced and said proportion of metal is incorporated therein.

3. The process of producing a transparent synthetic resin which includes introducing into a mixture containing a polybasic acid and a polyhydric alcohol that minute determinate proportion of a selected metal which when incorporated in said resin will inhibit the production of color that would otherwise occur therein, and heating the mixture until said resin is produced and said proportion of metal is incorporated therein.

4. The process of producing a transparent synthetic resin which includes introducing into a mixture containing a selected carbocyclic-hydroxyl derivative and a selected aldehyde that minute determinate proportion of a selected metal which when incorporated in said resin will inhibit the production of color that would otherwise occur therein, and heating the mixture until said resin is produced and said proportion of metal is incorporated therein.

5. The process which includes ascertaining the minute determinate proportion of a selected metal which will increase the transmission of light through a particular resinous condensation product when incorporated therein, adding the selected metal in the ascertained proportion to the material entering into the formation of said product, and causing the added metal to become incorporated therein.

6. The process which includes ascertaining the minute determinate proportion of a selected metal which will increase the transmission of light through a particular resinous polymerization product when incorporated therein, adding the selected metal in the ascertained proportion to the material entering into the formation of said product, and causing the added metal to become incorporated therein.

7. The process of producing a condensation product which includes mixing with the material that enters into the formation of said product that minute determinate proportion of a selected metal which when incorporated in said product will inhibit the production of color which would otherwise occur therein, and heating the mixture until said product is produced and said proportion of metal is incorporated therein.

8. The process of producing a polymerization product which includes mixing with the material that enters into the formation of said product that minute determinate proportion of a selected metal which when incorporated in said product will inhibit the production of color which would otherwise occur therein, and heating the mixture until said product is produced and said proportion of metal is incorporated therein.

9. In the production of an organic compound of the type which is at least partially transparent but has a tendency to discolor, the process which includes ascertaining the minute determinate proportion of a selected metal which when incorporated therein will inhibit said tendency to discolor; adding the selected metal in the ascertained proportion to the material entering into the formation of said compound, and causing the added metal to become incorporated in the compound.

10. The synthetic resin which results from the condensation of phthalic anhydride and ethylene glycol in the proportion of one molecule of each, accompanied by the introduction therein of from 25 to 35 parts by weight in ten million of copper carbonate, heating the mixture to a temperature of from 110 to 150 degrees centigrade, and maintaining the mixture at this temperature, while constantly agitating the same, until said resin is produced and said metal is incorporated therein.

11. The substantially colorless resin which results from the condensation of a mixture containing phthalic anhydride and ethylene glycol accompanied by the incorporation therein of that minute determinate proportion of a selected metal which renders said resin substantially free from the production of color which would occur in a resin composed of the same ingredients and treated in the same manner but without said proportion of metal.

12. The substantially transparent resin which results from the condensation of a mixture containing a selected polybasic acid and a selected polyhydric alcohol accompanied by the incorporation therein of that minute determinate proportion of a selected metal which renders said resin substantially free from the color which would occur in a resin composed of the same ingredients and treated in the same manner but without said proportion of metal.

13. The substantially transparent resin which results from the condensation of a selected carbocyclic-hydroxyl derivative and a selected aldehyde accompanied by the incorporation therein of that minute determinate proportion of a selected metal which renders said resin substantially free from the color which would occur in a resin composed of the same ingredients and treated in the same manner but without said proportion of metal.

14. An alkyd resin having incorporated therein that minute determinate proportion of a selected metal whereby said resin has a transmission for visible light of the order of 88% for one millimeter thickness.

15. A synthetic resin having incorporated therein that minute determinate proportion of a selected metal which imparts to said resin a materially higher light transmissiveness than that of a resin composed of the same ingredients and treated in the same manner but without said proportion of metal.

16. A synthetic resin having incorporated therein that minute determinate proportion of a selected metal which renders said resin substantially free from the color which would occur in a resin composed of the same ingredients and treated in the same manner but without said proportion of metal.

17. A resinous product having incorporated therein that minute determinate proportion of a selected metal whereby said product has a transmission for visible light of the order of 88% for one millimeter thickness.

18. A resinous product having incorporated therein that minute determinate proportion of a selected metal which stabilizes said product against the deterioration which would occur upon prolonged exposure to light in a compound composed of the same material and treated in the same manner, but without said proportion of metal.

19. A condensation product having incorporated therein that minute determinate proportion of a selected metal which imparts to said product a materially higher light transmissiveness than that of a product composed of the same ingredients and treated in the same manner but without said proportion of metal.

20. An organic compound having incorporated therein that minute determinate proportion of a selected metal which renders said compound substantially free from the color which would occur in a compound composed of the same ingredients and treated in the same manner but without said proportion of metal.

21. The process of treating an animal fat of the type which is subject to deterioration upon prolonged exposure to light and/or heat which includes introducing into said fat that minute determinate proportion of a selected metal which when incorporated therein will inhibit said deterioration, and causing said proportion of metal to become incorporated in said fat.

22. The process of treating a vegetable oil of the type which is subject to deterioration upon prolonged exposure to light and/or heat which includes introducing into said oil that minute determinate proportion of a selected metal which when incorporated therein will inhibit said deterioration, and causing said proportion of metal to become incorporated in said oil.

23. The process of treating an oleaginous compound of the type which is subject to deterioration upon prolonged exposure to light and/or heat which includes introducing into said compound that minute determinate proportion of a selected metal which when incorporated therein will inhibit said deterioration, and causing said proportion of metal to become incorporated in said compound.

24. An animal fat of the type which would otherwise be subject to deterioration upon prolonged exposure to light and/or heat, having incorporated therein that minute determinate proportion of a selected metal which inhibits said deterioration.

25. A vegetable oil of the type which would otherwise be subject to deterioration upon prolonged exposure to light and/or heat, having incorporated therein that minute determinate proportion of a selected metal which inhibits said deterioration.

26. An oleaginous compound of the type which would otherwise be subject to deterioration upon prolonged exposure to light and/or heat, having incorporated therein that minute determinate proportion of a selected metal which inhibits said deterioration.

27. A polymerization compound having incorporated therein that minute determinate proportion of a selected metal which renders said compound substantially free from the color which would occur in a compound composed of the same ingredients and treated in the same manner but without said proportion of metal.

28. An organic compound having incorporated therein that minute determinate proportion of copper which renders said compound substantially free from the color which would occur in a compound composed of the same ingredients and treated in the same manner but without said proportion of metal.

29. An organic compound having incorporated therein that minute determinate proportion of cobalt which renders said compound substantially free from the color which would occur in a compound composed of the same ingredients and treated in the same manner but without said proportion of metal.

ALLEN D. WHIPPLE.